United States Patent

[11] 3,630,741

| [72] | Inventor | Jacques Vial<br>Sarcelles, France |
|---|---|---|
| [21] | Appl. No. | 857,585 |
| [22] | Filed | Sept. 12, 1969 |
| [45] | Patented | Dec. 28, 1971 |
| [73] | Assignee | Eastman Kodak Company<br>Rochester, N.Y. |
| [32] | Priority | Dec. 31, 1968 |
| [33] | | France |
| [31] | | 182377 |

[54] ADHESIVE GELATIN-TERPOLYMER MATERIALS HAVING AT LEAST ONE CONJUGATED VINYLENE DICARBONYL COMPOUND ADDED TO THE EMULSION POLYMERIZATION REACTION MIXTURE
10 Claims, No Drawings

[52] U.S. Cl.................................................. 96/87,
96/111, 96/114, 260/8
[51] Int. Cl........................................................ G03c 1/80
[50] Field of Search............................................ 96/87, 111,
114; 260/8, 73 R

[56] References Cited
UNITED STATES PATENTS

| 2,852,378 | 9/1958 | Nadeau et al................. | 96/87 |
|---|---|---|---|
| 3,053,661 | 9/1962 | Starck et al................... | 96/87 |
| 3,295,980 | 1/1967 | Rees et al. .................... | 96/111 X |
| 3,460,945 | 8/1969 | Kolesinski et al............. | 96/87 |
| 3,488,708 | 1/1970 | Smith............................ | 96/87 |
| 3,497,358 | 2/1970 | Sieg et al. .................... | 96/111 |
| 3,501,301 | 3/1970 | Nadeau et al................. | 96/87 |

*Primary Examiner*—John T. Goolkasian
*Assistant Examiner*—Joseph C. Gil
*Attorneys*—Walter O. Hodsdon and Dwight J. Holter ABSTRACT: The introduction of at least one conjugated vinylene dicarbonyl compound into an emulsion polymerization reaction mixture comprising water, monomers and gelatin used to produce gelatin-terpolymer compositions useful as subbing layers for photographic films provides a subbing material having substantially improved adhesive characteristics.

ADHESIVE GELATIN-TERPOLYMER MATERIALS HAVING AT LEAST ONE CONJUGATED VINYLENE DICARBONYL COMPOUND ADDED TO THE EMULSION POLYMERIZATION REACTION MIXTURE

This invention relates to methods and materials for suitably adhering hydrophilic colloid layers to polyester supports. In one aspect this invention relates to photographic elements and methods and materials for preparing such elements. In another aspect this invention relates to methods for preparing compositions which promote adhesion of layers having hydrophilic binders, e.g., gelatin-silver halide emulsion layers, to polyester support materials.

It is well known that layers which have hydrophilic colloidal binders adhere poorly to polyester supports, such as poly(ethylene terephthalate). It has been suggested that the use of adhesive copolymer sublayers, applied between the support and the layer containing the hydrophilic colloidal binder will improve adhesion of the binders to polyester support. For example, British Pat. No. 1,039,935 describes such copolymers used in the form of hydrosols prepared by copolymerizing vinylidene chloride, acrylonitrile, or an acrylic ester and acrylic acid in an aqueous gelatin solution. However, these hydrosols do not always assure a satisfactory adherence of hydrophilic binder layers to a polyester support. When, for example, support which has been provided with a hydrophilic colloid layer is subsequently subjected to various treating compositions as in photographic processing, there is a tendency for the hydrophilic colloid to separate from the polyester support.

According to the present invention there are provided methods for producing gelatin-terpolymer compositions by forming the terpolymer-gelatin composition from a reaction mixture which contains: water; the monomers, reacted units of which make up the terpolymer; gelatin; and at least one conjugated vinylene dicarbonyl compound, that is, a compound having a carbon-carbon double bond between and in conjunction with two carbonyl groups, at least one of said carbonyl groups being a carboxy group or water-soluble salts thereof.

Using such reaction mixtures and methods surprisingly results in increased yields in less time of materials (aqueous polymer dispersions) which are effectively utilized to produce subbing compositions having remarkable adhesive characteristics when utilized for bonding gelatin-containing layers to polyesters, especially poly(ethylene terephthalate). Photographic film products prepared using such subbing compositions exhibit an especially low susceptibility to layer separation when contacted by various photographic processing solutions.

The aqueous polymer dispersions according to the invention comprise gelatin and terpolymer advantageously comprising 60/100 to 80/100 by weight of vinylidene chloride, 10/100 to 30/100 by weight of acrylonitrile or of an acrylic ester, such as methyl acrylate or ethyl acrylate, 1/100 to 12/100 by weight of acrylic acid and contains at least one conjugated vinylene dicarbonyl compound, such as mucochloric acid (or one of its derivatives which have tanning properties for the gelatin) which has been added to the mixture used for the preparation of the terpolymer in the presence of gelatin.

Conjugated vinylene dicarbonyl compounds advantageously employed according to the present invention desirably are of the general formula $$RCOXC = CYCOOH$$

wherein R represents a group selected from the class —H, —OH, and —OR' wherein R' is an organic moiety desirably having about one to 10 carbon atoms and advantageously an alkyl moiety, e.g., lower alkyl having one to four carbon atoms; and X and Y are independently selected from the class consisting of hydrogen; halogens, e.g., chloride or bromide, and —OR'' wherein R'' represents an organic moiety advantageously an aryl group; i.e., an aromatic, carbocyclic nucleus of the benzene series especially having the structure:

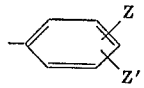

wherein the substituents Z and Z' are selected from hydrogen, halogen, alkyl, carboxyl, alkoxy, formyl, tertiaryamine, and sulfo moieties as described in French Pat. No. 1,491,428. Advantageously the carbonyl moieties are in cis relationship.

In an especially advantageous embodiment of the present invention the conjugated vinylene dicarbonyl compound is selected from the group consisting of maleic acid, mucochloric acid, mucobromic acid, and 2-(p-carboxyphenoxy)-3chloromalealdehydic acid and dissolved residues thereof.

The conjugated vinylene dicarbonyl compound represents approximately from 1/1000 to 5/100 and, advantageously, 2/1000 to 2/100 of the mass of the unsaturated monomers and the gelatin represents, advantageously, 15/100 to 60/100 of the mass of these same monomers. The aqueous dispersions of the copolymers according to the invention contain, advantageously, 0.6 gm. to 5 gm. of mucochloric acid per 100 gm. of gelatin. The quantity of water, used in the preparation of copolymer dispersions according to the invention, may vary to a great extent, but the water represent, advantageously, 70/100 to 80/100 of the mass of the copolymer dispersions according to the invention.

The copolymer dispersions according to the invention have the advantage over dispersions of the prior art in that they tan the gelatin of the anchoring layer.

The aqueous dispersions of the copolymers according to the invention are prepared advantageously by means of a process of emulsion polymerization, in the presence of gelatin, e.g., by a process such as described in French Pat. No. 1,355,208. One must note, however, that the mixtures of monomers serving for the preparation of the copolymers according to the invention display a speed of polymerization approximately two times faster than the mixtures of similar monomers but which do not contain mucochloric acid or one of its derivatives, all other conditions of polymerization being otherwise unchanged. This increase of the polymerization speed can be attributed to the presence of a catalytic system of the redox type comprising a common polymerization catalyst having free radicals, (such as potassium persulfate, which acts as oxidizing agent) and mucochloric acid or one of its derivatives which, in its lactone form, acts as reducing agent. It has thus been found that the mass yield of the preparation of copolymers according to the invention can reach 892/1000 after 12 hours of reaction at 60° C., whereas it reaches only 852/100 without mucochloric acid after 18 hours of reaction at 60° it is also possible to replace the mucochloric acid in this catalytic system with maleic acid but the copolymer obtained has no longer the tanning properties by itself.

The copolymer dispersions according to the invention are prepared advantageously by operating at a temperature between approximately 55° C. and 65° C. and the catalyst used is generally present in a 25/10,000 to 1/100 concentration in relation to the total weight of the monomers.

In order to prepare the improved photographic products according to the invention, first of all an anchoring composition is prepared by adding, to the aforestated aqueous dispersion of copolymer, an aqueous solution of gelatin, an agent that attacks the polyester support such as resorcinol, a surface-active agent and an organic acid such as malonic acid, salicylic acid or triflouroacetic acid, in order to adjust the pH value of the adhesive composition to a value between 2 and 3.

Surface-active agents useful in the preparation of the compositions according to the invention are ionic or cationic surface-active agents.

A bactericidal or fungicidal agent may be incorporated in the composition according to the invention, e.g., p-chloro-m-xylenol or chlorinated biphenyl.

Particularly useful compositions, according to the invention, comprise approximately 0.5 to 7.5 parts of the dispersion of copolymer according to the previously described invention, approximately 0.1 to 1.5 parts of gelatin, approximately 1 to 15 parts of an agent that improves the adherence such as resorcinol, pyrocatechol or pyrogallol, approximately 0.05 to 0.20 parts of a surface-active agent and approximately 0.1 to 0.5 parts of an organic acid chosen from among malonic acid, salicylic acid, or trifluoroacetic acid in order to adjust the pH value of said compositions to a value between 2 and 3.

The thusly prepared composition can be applied over a polyester support such as an ethyleneglycol polyterphthalate film stretched and stabilized by operating according to any common coating process whatsoever. This composition may then be dried and a silver halide emulsion layer coated on it. It is noted that the emulsion layer of the photographic products according to the invention, in the dry state, adheres very well to polyester supports and these photographic products may be treated in the usual chemical baths without changing the adherence of the emulsion layer to its support.

The following examples illustrate the invention and/or advantages thereof.

EXAMPLE 1

One introduces, with agitation, into a 3 l. glass flask provided with a reflux condenser, 75 gm. of gelatin, 1.060 gm. of distilled water, 1.25 gm. of potassium persulfate, 1 gm. of mucochloric acid, 25 gm. of acrylic acid, 191.25 gm. of vinylidene chloride and 33.75 gm. of methylacrylate. The mixture is brought to 60° C. and is then kept at this temperature for 18 hours. The copolymerization is practically completed. The mixture is filtered through a nylon cloth and 1,330 gm. of a latex containing 217/1000 of dry materials are obtained. The mass yield of the copolymerization is 88.6 percent.

From the dispersion of the thusly obtained copolymer, the following composition is prepared:

| | |
|---|---|
| Dispersion of the copolymer | 100 gm. |
| 5% aqueous solution of gelatin | 125 ml. |
| Resorcinol | 75 gm. |
| Malonic acid | 2 gm. |
| Cetylbetaine (surface-active agent) | 1.5 ml. |
| 4% p-chloro-m-xylene solution in methanol | 4.5 ml. |
| Water—sufficient quantity for obtaining | 1 l. |

The thusly prepared composition is applied onto an ethyleneglycol polyterephthalate support by means of the wetting and counterwetting technique. The film is made to pass into a first drier at 90° C. wherein it remains for 5 minutes, then it passes into a second drier at 120° C. wherein it remains for 6 minutes. A high-contrast, green-sensitized silver-gelatin-chlorobromide emulsion layer (U.S. Pat. No. 2,756,148, example 1) is coated onto the thusly obtained sublayer. The emulsion is then dried. The emulsion adheres very well to its support, both in the dry state and even after treatment in the usual photographic baths.

Moreover, a dispersion is prepared of a copolymer not belonging to the invention, which is similar to the previous copolymer but does not contain mucochloric acid, and a control composition from this dispersion, then a photographic product is prepared as described. The adherence of the emulsion layer of this control product is poor when dry.

EXAMPLE 2

The procedure according to example 1 is followed but with 2 gm. of mucochloric acid and by heating for 12 hours at 60° C. In this way, 1,258 gm. of a latex having 227/1000 parts of dry materials are obtained, i.e., with an 89.2 percent mass yield of copolymerization. The photographic product containing a sublayer prepared from this latex displays a good adherence of the emulsion in the dry state and after treatment in the photographic baths.

EXAMPLE 3

The procedure according to example 1 is followed but with 3 gm. of mucochloric acid and by heating for 16 hours at 60° C. 1,305 gm. of a latex having 222/100 parts of dry materials are thus obtained, i.e., with an 89.1 percent copolymerization mass yield. The emulsion layer of the photographic product displays a good adherence in the dry state and after treatment in the photographic baths.

Example 4

The procedure according to example 1 is followed but with 5 gm. of mucochloric acid and by heating for 16 hours at 60° C. 1305 gm. of a latex having 203/1000 parts of dry materials are thus obtained, i.e., 76.6 percent mass yield of copolymerization. The resultant photographic product displays the same characteristics of adherence as the photographic product obtained in example 1.

EXAMPLE 5

Into a 3 l. glass flask provided with an agitator and a reflux condenser, a solution of 60 gm. of gelatin is introduced in 400 ml. of distilled water and a stream of nitrogen is made to pass through it. Then, with agitation, 510 ml. of distilled water are introduced, 1.25 gm. potassium persulfate solution in 50 ml. of water, 41.5 ml. of freshly distilled acrylonitrile, 150.5 ml. of freshly distilled vinylidene chloride, 19.5 freshly distilled acrylic acid, 2 gm. of mucochloric acid and 50 ml. of 1/100 cetylbetaine aqueous solution. A stream of nitrogen is made to pass again, then the temperature of the reaction medium is brought up to 60° C. within 2 hours. This temperature is kept for 18 hours. The mixture is then filtered through a nylon cloth and 1,220 gm. of a latex are obtained which contains 202/1000 of dry materials. The mass yield of the copolymerization is 82 percent.

A composition is prepared from this latex according to the procedure of example 1. The resultant composition is used to prepare a photographic product as in example 1. The photographic product displays a good emulsion adherence in the dry state and after treatment in the usual baths, such as hydroquinone developer, a sodium thiosulfate stabilizer and a stabilizer containing formaldehyde.

EXAMPLE 6

The procedure according to example 1 is followed except that for the mucochloric acid there is substituted 1 gm. of 2-(p-carboxyphenoxy)-3-chloromalealdehydic acid. 1,325 gm. of a latex are thus obtained which contains 21/100 of dry materials. The mass yield of copolymerization is 86.5 percent.

A composition is then prepared which is applied onto a polyester support as in example 1. The product is then submitted to over heating at 130° C. for 10 minutes so as to promote the tanning action of the copolymer on the gelatin contained in the latex.

An emulsion layer is then coated, the adhering characteristics of the resultant product are similar to those of the product of example 1.

EXAMPLE 7

The procedure according to example 6 is followed but with 2 gm. of 2-(p-carboxyphenoxy)-3-chloromalealdehydic acid. 1410 gm. of a latex are thus obtained containing 208/1000 of dry materials, i.e., an 89.2 percent yield. The adhering characteristics of the resulting photographic product are similar to those of the product of example 1.

EXAMPLE 8

The procedure according to example 6 is followed but with 1.35 gm. 2-(p-carboxyphenoxy)-3-chloromalealdehydic acid. 1,380 gm. of a latex are thus obtained containing 203/1000 of dry materials, that is to say, an 86.1 percent yield. The adhering characteristics of the resulting photographic product are similar to those of the product of example 1.

EXAMPLE 9

The procedure according to example 6 is followed but with 2.7 gm. 2-(p-carboxyphenoxy)-3-chloromalealdehydic acid. 1,245 gm. of a latex are thus obtained containing 23/100 of dry materials, that is to say, an 83.3 percent yield. The adhering characteristics of the resulting photographic product are similar to those of the product of example 1.

EXAMPLE 10

The procedure according to example 6 is followed but with 4.7 gm. of modified mucochloric acid. 1,350 gm. of a latex are obtained that contains 205/1000 of dry materials, i.e., an 83.9 percent yield. The adhering characteristics of the resulting photographic product are similar to those of the product of example 1.

The tanning of the anchoring sublayer, prepared in examples 6 to 10, is very good, as shown by the results of the following table which indicates the gelatin content of substrated supports according to the invention after immersion in water at 30° C. This table shows drying the anchoring sublayers prepared from dispersions of copolymers, according to the invention, containing 2-(p-carboxyphenoxy)-3-chloromalealdehydic acid, to obtain the desired extent of tanning of the sublayer.

Tanning of the Gelatin
Gelatin Content (g./m.$^2$)

| Example | Undried Support | | Support Dried for 10 Min. at 130° C. | |
| --- | --- | --- | --- | --- |
| | Test 30° C. | Test 36° C. | Test 30° C. | Test 36° C. |
| 6 | 0.25 | 0.07 | 0.40 | 0.35 |
| 7 | 0.18 | 0.05 | 0.25 | 0.22 |
| 8 | 0.22 | 0.05 | 0.35 | 0.30 |
| 9 | 0.30 | 0.11 | 0.35 | 0.35 |
| 10 | 0.12 | 0.07 | 0.12 | 0.10 |

It is emphasized that the adherence of the emulsion layers of the photographic layers prepared in examples 6 to 10 is excellent both for the products in the dry state and after treatment in the usual photographic baths.

EXAMPLE 11

The procedure according to example 1 is followed except that in the preparation of the copolymer dispersion for the mucochloric acid there is substituted 1.5 gm. of maleic acid. 1,265 gm. of a latex containing 221/1000 of dry materials are thus obtained, i.e., an 86 percent mass yield of copolymerization.

A composition as in example 1 is then prepared, but by adding pb 18 ml. of a 1 percent chrome alum solution per 1 l. of the copolymer dispersion. The photographic product obtained using this composition displays the same characteristics as the photographic product of example 1.

The invention has been described in detail with particular reference to preferred embodiments thereof, but it will be understood that variations and modifications can be effected within the spirit and scope of the invention.

We claim:

1. In a method for producing gelatin-terpolymer compositions by forming the terpolymer-gelatin composition from a reaction mixture which contains: water, monomers which react to make up the polymer, and gelatin; the improvement comprising including in said reaction mixture conjugated vinylene dicarbonyl compounds.

2. The invention according to claim 1 and wherein said vinylene dicarbonyl compound is represented by the formula RCOXC=CYCOOH or soluble salts thereof wherein R represents —H, —OH, or —OR' wherein R' is an organic moiety having about one to 10 carbon atoms; and X and Y are groups independently selected from the class consisting of hydrogen, halogens, and —OR" wherein R" represents an aromatic nucleus of the benzene series.

3. The invention according to claim 2 and wherein the carbonyl moieties of said vinylene dicarbonyl compound are in cis relationship.

4. The invention according to claim 2 and wherein said conjugated vinylene dicarbonyl compound is present in about 0.1 part to about 5 parts by weight per 100 parts by weight of the monomers.

5. The invention according to claim 2 and wherein said conjugated vinylene dicarbonyl compound is present in about 0.1 part to about 5 parts by weight per 100 parts by weight of the monomers, and the monomers comprise 60 to 80 percent by weight vinylidene chloride, 10 to 30 percent by weight acrylic ester or acrylonitrile and 1 to 12 percent by weight acrylic acid.

6. The invention according to claim 1 and wherein said conjugated vinylene dicarbonyl is at least one member selected from the group consisting of maleic acid, mucohalic acids, 2-(p-carboxyphenoxy)-3-chloromalealdehydic acid and dissolved residues thereof.

7. The invention according to claim 1 and wherein said conjugated vinylene dicarbonyl is at least one member selected from the group consisting of maleic acid, mucochloric acid, 2-(p-carboxyphenoxy)-3-chloromalealdehydic acid and dissolved residues thereof and is present in about 0.1 part of about 5 parts by weight per 100 parts by weight of monomers.

8. The invention according to claim 1 and wherein said conjugated vinylene dicarbonyl compound is at least one member selected from the group consisting of maleic acid, mucohalic acids, 2-(p-carboxyphenoxy)-3-chloromalealdehydic acid and dissolved residues thereof and is present in about 0.1 part to about 5 parts by weight per 100 parts by weight of the monomers, and the monomers comprise 60 to 80 percent by weight vinylidene chloride, 10 to 30 percent by weight acrylic ester or acrylonitrile and 1 to 12 percent by weight acrylic acid.

9. A composition prepared in accordance with the method of claim 1.

10. In a photographic film material comprising a polyester support bearing photographic gelatin emulsion thereon which emulsion is adhered to said support by an interlayer containing emulsion polymerized terpolymer-gelatin composition prepared from a reaction mixture comprising water, gelatin, vinylidene chloride, acrylic ester or acrylonitrile, and acrylic acid, the improvement wherein said reaction mixture further includes at least one member selected from the group consisting of maleic acid, mucohalic acids, 2-(p-carboxyphenoxy)-3-chloromalealdehydic acid and dissolved residues thereof.

* * * * *

PO-1050
(5/69)

UNITED STATES PATENT OFFICE
CERTIFICATE OF CORRECTION

Patent No. ____3,630,741____  Dated ____December 28, 1971____

Inventor(s) ____Jacques Vial____

It is certified that error appears in the above-identified patent and that said Letters Patent are hereby corrected as shown below:

Column 2, line 49, delete "100", insert --1000--;
  line 50, following 60° insert --C--.
Column 3, line 70, delete "1,258", insert --1,285--.
Column 4, line 3, delete "100", insert --1000--; line 55,
  delete "over", insert --oven--.
Column 5, line 58, delete "pb".
Column 6, line 22, delete "100", insert --1000--;
  line 26, delete "100", insert --1000--; line 41,
  delete "100", insert --1000--; and line 47, delete
  "100", insert --1000--.

Signed and sealed this 20th day of June 1972.

(SEAL)
Attest:

EDWARD M. FLETCHER, JR.　　　　　　　ROBERT GOTTSCHALK
Attesting Officer　　　　　　　　　　Commissioner of Patents